United States Patent [19]

Sejnoha

[11] Patent Number: 5,682,464
[45] Date of Patent: Oct. 28, 1997

[54] WORD MODEL CANDIDATE PRESELECTION FOR SPEECH RECOGNITION USING PRECOMPUTED MATRIX OF THRESHOLDED DISTANCE VALUES

[75] Inventor: Vladimir Sejnoha, Cambridge, Mass.

[73] Assignee: Kurzweil Applied Intelligence, Inc., Waltham, Mass.

[21] Appl. No.: 377,948

[22] Filed: Jan. 25, 1995

Related U.S. Application Data

[63] Continuation-in-part of Ser. No. 905,345, Jun. 29, 1992, Pat. No. 5,386,492, and a continuation-in-part of Ser. No. 250,696, May 27, 1994, Pat. No. 5,546,499.

[51] Int. Cl.$^6$ ..................................................... G10L 5/06
[52] U.S. Cl. ..................... 395/2.47; 395/2.5; 395/2.52; 395/2.61
[58] Field of Search ..................... 395/2.47, 2.48, 395/2.49, 2.5, 2.6, 2.61, 2.52

[56] References Cited

U.S. PATENT DOCUMENTS

| | | | |
|---|---|---|---|
| 4,181,821 | 1/1980 | Pirz et al. | 395/2.61 |
| 4,601,054 | 7/1986 | Watari et al. | 395/2.47 |
| 4,618,983 | 10/1986 | Nishioka et al. | 395/2.48 |
| 4,677,673 | 6/1987 | Ukita et al. | 395/2.62 |
| 4,712,243 | 12/1987 | Ninomiya et al. | 395/2.59 |
| 4,715,004 | 12/1987 | Kabasawa et al. | 395/2.61 |
| 4,783,804 | 11/1988 | Juang et al. | 395/2.54 |
| 4,797,929 | 1/1989 | Gerson et al. | 395/2.52 |
| 4,799,262 | 1/1989 | Feldman et al. | 395/2.5 |
| 4,802,224 | 1/1989 | Shiraki et al. | 395/2.54 |
| 4,805,219 | 2/1989 | Baker et al. | 395/2.5 |
| 4,837,831 | 6/1989 | Gillick et al. | 395/2.54 |
| 4,866,778 | 9/1989 | Baker | 395/2.63 |
| 4,903,305 | 2/1990 | Gillick et al. | 395/2.54 |
| 4,975,962 | 12/1990 | Oka | 395/2.5 |
| 5,136,654 | 8/1992 | Ganong, III et al. | 395/2.47 |
| 5,337,394 | 8/1994 | Sejnoha | 395/2.5 |
| 5,386,492 | 1/1995 | Wilson et al. | 395/2.61 |
| 5,526,463 | 6/1996 | Gillick et al. | 395/2.6 |
| 5,546,499 | 8/1996 | Lynch et al. | 395/2.49 |

*Primary Examiner*—Allen R. MacDonald
*Assistant Examiner*—Tálivaldis Ivars Šmits
*Attorney, Agent, or Firm*—Henry D. Pahl, Jr.

[57] ABSTRACT

In the large vocabulary speech recognition system disclosed herein, a preliminary screening of vocabulary models is provided by applying high speed distance measuring functions. The distance measuring functions utilize subsampled or otherwise reduced representations of the unknown speech segment and the vocabulary models. The initial screening functions achieve very high speed by precalculating, for each utterance, a comparison table of distance values which can be used for all vocabulary models. The building of each comparison table is facilitated by a method which utilizes default values as initial entries and only adjusts entries which are meaningfully different from the default value.

10 Claims, 8 Drawing Sheets

WORD MODEL CANDIDATE PRESELECTION FOR SPEECH RECOGNITION USING PRECOMPUTED MATRIX OF THRESHOLDED DISTANCE VALUES

CROSS-REFERENCE TO RELATED APPLICATIONS

The present application is a continuation-in-part of application Ser. No. 07/905,345 filed Jun. 29, 1992, now U.S. Pat. No. 5,386,492 and a continuation-in-part of application Ser. No. 08/250,696 filed May 27, 1994 now U.S. Pat. No. 5,546,499.

BACKGROUND OF THE INVENTION

The present invention relates to speech recognition and more particularly to methods for preselecting or screening candidate models for accurate matching with an unknown speech segment or utterance.

In order to be useful for many user applications, a speech recognition system should be capable of recognizing a large vocabulary of words. Distinguishing between words in a large vocabulary system requires that the system be capable of a high degree of accuracy in comparing an unknown speech segment with the models representing the vocabulary words. As is understood, high accuracy carries with it a substantial cost in terms of computational complexity and, while various techniques have been evolving for efficiently doing the necessary calculations, it has been becoming increasingly necessary to provide some method of screening or preselecting candidate models prior to applying a high precision matching algorithm. The present invention utilizes several novel methods to effect preselection of candidate models in such a way that unlikely candidates are quickly weeded out with minimal risk of eliminating the best matches.

As speech recognition systems have developed to handle increasingly larger vocabularies, one technique which has evolved is the increasing use of pre-calculated similarity or distance measurements for use in the incremental comparing of an input utterance with a model, e.g. a hidden Markov model, representing a vocabulary word. For example, the input utterance is first converted to a sequence of input data frames e.g. representing spectral energy distributions, and each raw input frame is converted to the closest matching one of a set of standard or prototype data frames in a process which is frequently referred to as vector quanitization (VQ). Similarly, the word models are represented by respective sequences of standard or prototype states, e.g. probability distribution functions (pdf) in the case of hidden Markov models.

This use of standard or prototype input data frames and standard or prototype word model states allows pre-calculation of a distance metric for each possible combination of prototype input data frame with prototype model state. However, as vocabularies have grown larger, it has become necessary to increase the range of selection of both possible input data frames and prototype model states in order to provide the resolution and precision of calculation necessary to discriminate between similar sounding words. For example, for a speech recognition system having a vocabulary in the order of 40,000 words, it is advantageous to provide in the order of 1024 standard or prototype input data frames and 2048 standard or prototype model states. Accordingly, a complete table or matrix of pre-calculated distance metrics would comprise over 2,000,000 entries.

Further, in order to best fulfill its function, this table of precalculated distance metrics should be resident in the directly accessible or random access memory (RAM) of the processor which does the comparison calculations. It will be understood by those skilled in the art, this represents a substantial demand on system resources. Coassigned application Ser. No. 08/250,696 now U.S. Pat. No. 5,546,499 discloses a method for reducing the amount of stored data by thresholding the distance values and for compacting or compressing the resultant sparse matrix. The present invention utilized some of the same techniques.

SUMMARY OF THE INVENTION

The unknown speech segment is represented by a relatively fine sequence of frames and the vocabulary models are represented by the respective fine sequences of states. Preferably, the model states are drawn from a limited collection of predetermined states. Both the unknown segment and the models are subsampled or otherwise reduced in detail to obtain respective coarse sequences which are used in the screening distance measuring functions of the present invention. The reduced number of elements in the coarse sequence derived from the utterance are referred to herein as "representatives". The coarse sequence of each utterance and the coarse sequence of a model in effect define a comparison matrix.

In accordance with one aspect of the present invention, a temporary or preliminary matrix or table of needed values is precalculated for each unknown speech segment. The table holds, for each state in the limited collection (2048), a measure of the degree of match for that coarse sequence representative which provides the best match with that state in each possible state position in a subsampled reference model. In accordance with another aspect of the invention, the selection of best match is made without constraining the choice on the basis of adjacent states in the coarse sequence, a time warping constraint usually imposed in matching calculations, e.g. in accordance with normal Viterbi decoding. Accordingly, for each model to be considered, a cumulative value representing the overall match of the coarse sequence of representatives with the respective coarse sequence of states can be quickly determined by simple accessing the temporary table and accumulating the values obtained.

In accordance with another aspect of the present invention, the building of each comparison table is facilitated by a method which utilizes default values as initial entries and only adjusts entries which are meaningfully different from the default value.

Briefly, the present invention relates to a computer implemented system for recognizing spoken utterances of the type which compares an unknown speech segment represented by a fine sequence of frames, selected from a preselected set of prototype data frames, with word models, each of which is represented by a fine sequence of prototype states, again selected from a preselected set of prototype states. The invention provides a method of screening or preselecting candidate tokens for a subsequent, more accurate comparison. A matrix of distance metrics relating to prototype frames with prototype states is calculated and is then thresholded by assigning a default value to metrics which do not meet a preselected criterion for being meaningful. For each prototype frame, a list of prototype states is formed for which the distance metric is meaningful.

For each input utterance, a coarse set of input representatives is derived from the fine sequence, the number of representatives being a minor fraction of the number of frames in the corresponding fine sequence. A temporary matrix is generated which relates each of the sequence of input representatives to the full set of prototype states by performing the following steps. All of the entries in the temporary matrix are initially set to a default value. The input representatives are then scanned to locate corresponding lists of prototype states and those entries which are included in the corresponding lists are adjusted. Vocabulary models are likewise subsampled and the subsampled prototype states are scored using the temporary matrix.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
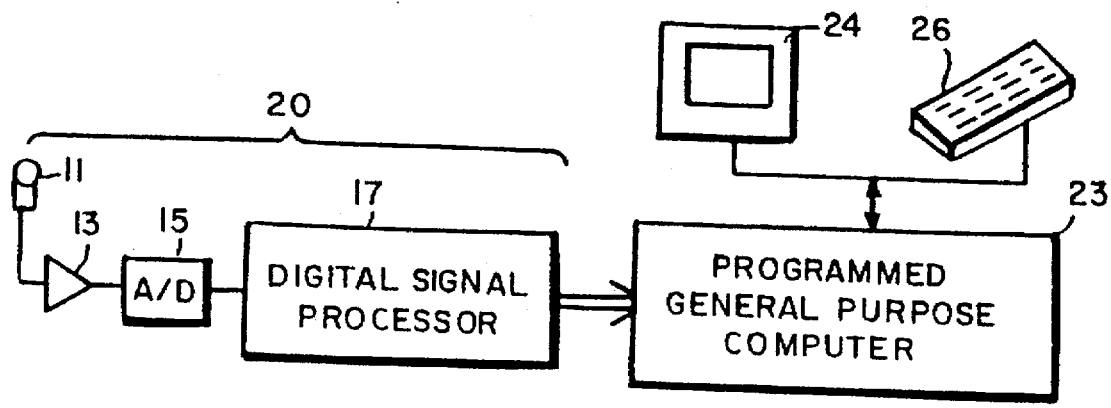
FIG. 1 is a block diagram of speech recognition apparatus employing vocabulary model preselection in accordance with the present invention.

In common with many prior art systems, the apparatus of the present invention operates by first transducing acoustic speech waveforms to obtain corresponding electrical signals and then digitizing those signals. With reference to FIG. 1, the transducer indicated there is a microphone 11 which is connected, through a suitable preamplifier 13, to an analog-to-digital converter 15. As is usual in the art, the speech signal is treated to obtain, at a succession of sample times, a sequence of digital values or data frames which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art.

Collectively, the front end circuitry is identified by reference character 20. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g. one employing an Intel 80486 microprocessor, is provided for general system management and control functions, as well as for the processing of distance or scoring calculations. As is conventional, computer 23 incorporates a video display 24 and a keyboard 26 for providing interaction with the system user.

The raw spectral information obtained from the front end circuitry 20 is further preprocessed in the computer 23 to replace each sample or input frame with an index which corresponds to or identifies one of a predetermined set of standard or prototype spectra or frames. In the particular embodiment being described, 1024 such standard frames are utilized. In the art, this substitution is conventionally referred to as vector quantization and the indices are commonly referred to as VQ indices. The preprocessing of the input data by the computer 23 also includes an estimating of the beginning and end of a word in an unknown speech input segment based on the energy level values. It should also be understood that the particular embodiment being described is a discrete word recognizer rather than a continuous speech recognizer but that the methods of the present invention could be applied to either type.

As indicated previously, vocabulary models are represented by sequences of standard or prototype states. Rather than corresponding to spectra, the state indices identify or correspond to probability distribution functions, the state index essentially serves as a pointer into a table which identifies, for each state index, the set of probabilities that each prototype frame or VQ index will be observed to correspond to that state index. The table is, in effect, a precalculated mapping between all possible frame indices and all state indices. Thus, for comparing a single frame and single state, a distance measurement or a measure of match can be obtained by directly indexing into the tables using the respective indices. As indicated previously, a preferred method of compacting and storing such a table is disclosed in coassigned application Ser. No. 08/250,696 now U.S. Pat. No. 5,546,499. That application, entitled "Speech Recognition System Utilizing Pre-calculated Similarity Measurements", was filed May 27, 1994 by Lynch et al. and the disclosure of that application is incorporated herein by reference.

As is understood by those skilled in the art, the distance or likelihood values which fill the tables can be generated by statistical training methods. Various such training methods are known in the art and, as they do not form a part of the present invention, they are not described in further detail herein. Rather, for the purposes of the present invention, it is merely assumed that there is some metric for determining degree of match or likelihood of correspondence between input frames and the states which are used to represent vocabulary models.

As is understood by those skilled in the art, natural variations in speaking rate require that some method be employed for time aligning a sequence of frames representing an unknown speech segment with each sequence of states representing a vocabulary word. This process is commonly referred to as time warping. The sequence of frames which constitute the unknown speech segment taken together with a sequence of states representing a vocabulary model in effect define a matrix and the time warping process involves finding a path across the matrix which produces the best score, e.g. least distance or cost. The distance or cost is typically arrived at by accumulating the cost or distance values associated with each pairing of frame index with state index as described previously with respect to the VQ (vector quantization) process.

As is also understood by those skilled in the art, the final comparing of an unknown speech segment with competing vocabulary models must be highly accurate if the procedure is to discern between similar and competing vocabulary models in a system having a large vocabulary. High accuracy comparisons are computationally intensive, even using vector quantization techniques, since a large number of possible paths across the matrix must be explored. Accordingly, in order to reduce the number of high accuracy comparisons which must be performed, the apparatus of the present invention preferably also utilizes a succession of screening steps to preselect candidates. Such preselection processes are known in the art. It may be noted that the time warping functions and the pre-screening function are both facilitated by the availability of precalculated distance measurements, as is the final and most precise comparison of an input utterance with candidate word models.

Figure 2:
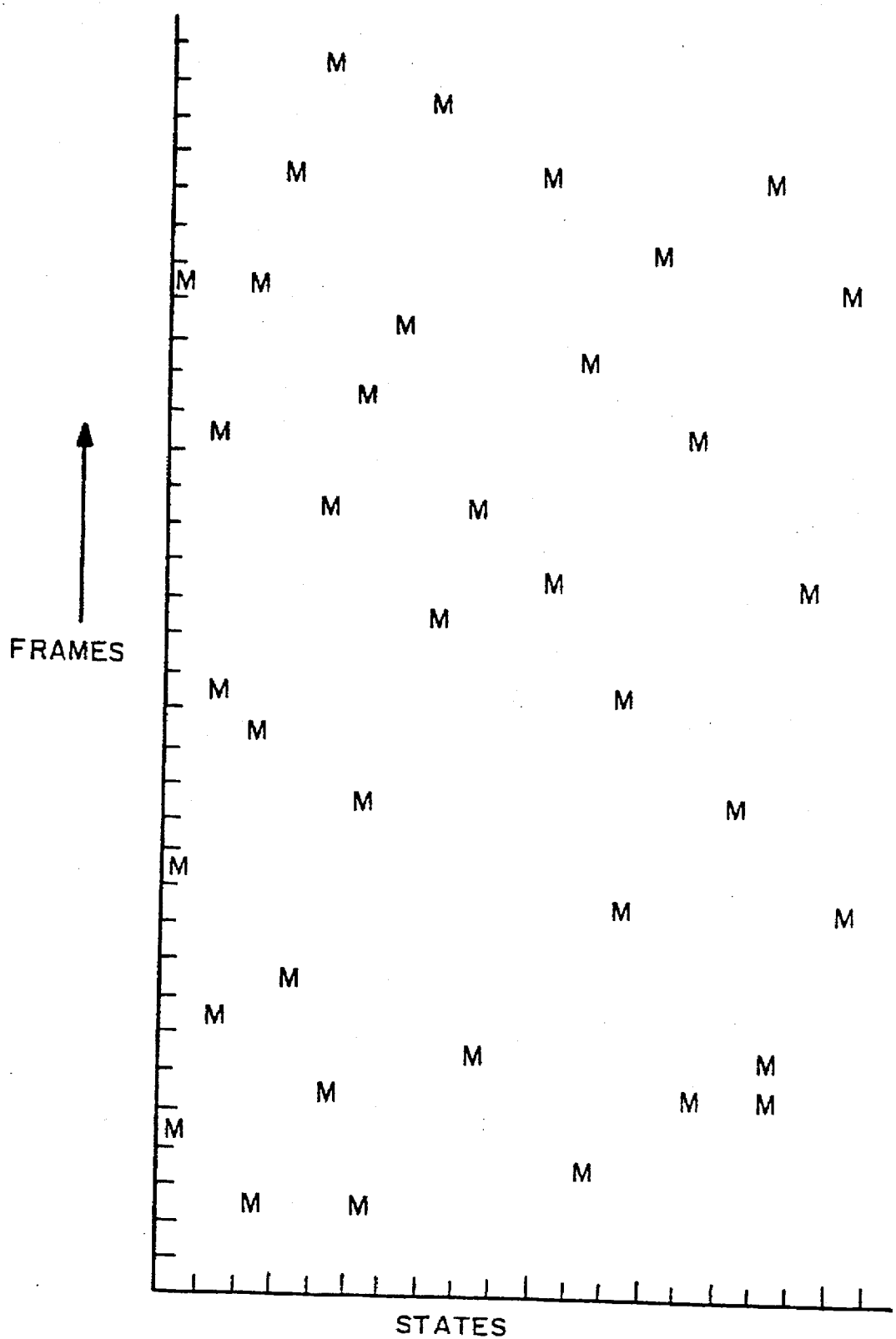
FIG. 2 is a diagram illustrated an array of precalculated distance metrics useful for comparing input data frames with model prototype states.

As indicated earlier, FIG. 2 represents a portion of a table of distance pre-calculated metrics which represents the degree of match between each standard or prototype input frame with each standard or prototype model state. In the embodiment described herein, the distance metric DIST(S, F) is meant to represent the scaled negative logarithm of the probability of observing frame F given state S.

$$DIST(S,F) = -A * \log(Pr(F/S))$$

where A is the scaling factor. Thus, for a given state or column S the sum over F of Pr(F/S) will come to unity. As is understood by those skilled in the art, this represents the output symbol probability distribution of a Hidden Markov Model.

As also indicated previously, the complete table of all the possible distance metrics would comprise in the order of two million entries, assuming one thousand prototype input data frames and two thousand prototype model states.

In terms of an address space, the horizontal axis i.e. the state indices may be considered as the higher order address bits and the frame indices to be the lower order address bits. Eleven bits and ten bits are required for 2048 and 1024 elements respectively.

In accordance with one aspect of the present invention only the more useful entries in the table of FIG. 2 are preserved and stored for use during actual speech recognition. In other words, only some entries are considered to be meaningful. In FIG. 2, the meaningful entries are represented by the letter M. Since small distances represent good matches between input frame and state, the small distance metrics are maintained exactly while larger distances considered non-meaningful are assigned default values. This approximation for the larger values is predicated on the fact that these larger values do not contribute usefully to identifying matches of word models with input utterances. A separate default value is determined for each state or column in the table of FIG. 2, as described hereinafter.

To determine the entries which are to be retained as being meaningful, the entries are first sorted starting with the highest probabilities (smallest distances). Starting with the highest probability entry, the contributions of the entries are accumulated until a fixed cumulative probability is reached. The contributing entries are retained as being meaningful. The fixed cumulative probability is a design parameter which is selected to keep the percentage of retained entries at a desired level, given the training data upon which the distances are based. In the preferred practice of the present invention, the fixed cumulative threshold is preselected so that approximately 98% of the total probability is retained. In practice, this results in about 7% of the entries being considered meaningful and being retained. However, the use of the present invention continues to be advantageous for retained entries up to about 20%.

Considering only the meaningful entries, the overall array can be considered to be a "sparse" matrix. Further, each column corresponding to a given state can be likened by analogy to a comb with most of its teeth missing. This comb analogy is useful in explaining the compression or packing method described in application Ser. No. 08/250,696 now U.S. Pat. No. 5,546,499. The packing method can to some extent be analogized to overlying several such combs with offsets such that none of the teeth remaining in one comb interfere with the remaining teeth in any other comb.

Once the meaningful entries have been determined, a default distance is determined for the remaining i.e. non-meaningful entries. This default value is determined so that the remaining probability is used up, i.e. so that the sum of all of the probabilities is unity. Thus, the default distance may be defined as follows:

$$DefaultDist(s) = -A * \log\left(\frac{1 - sum(s)}{Numb(D)}\right)$$

where Sum(s) is the sum of the probabilities for the meaningful entries and Numb(D) is the number of non-meaningful or default entries.

In the preferred embodiment of the present invention the default value is capped if it is too large. In practice, the distance metrics are scaled so that they can be stored as unsigned bytes and thus the largest possible default value is 255.

Figure 3:
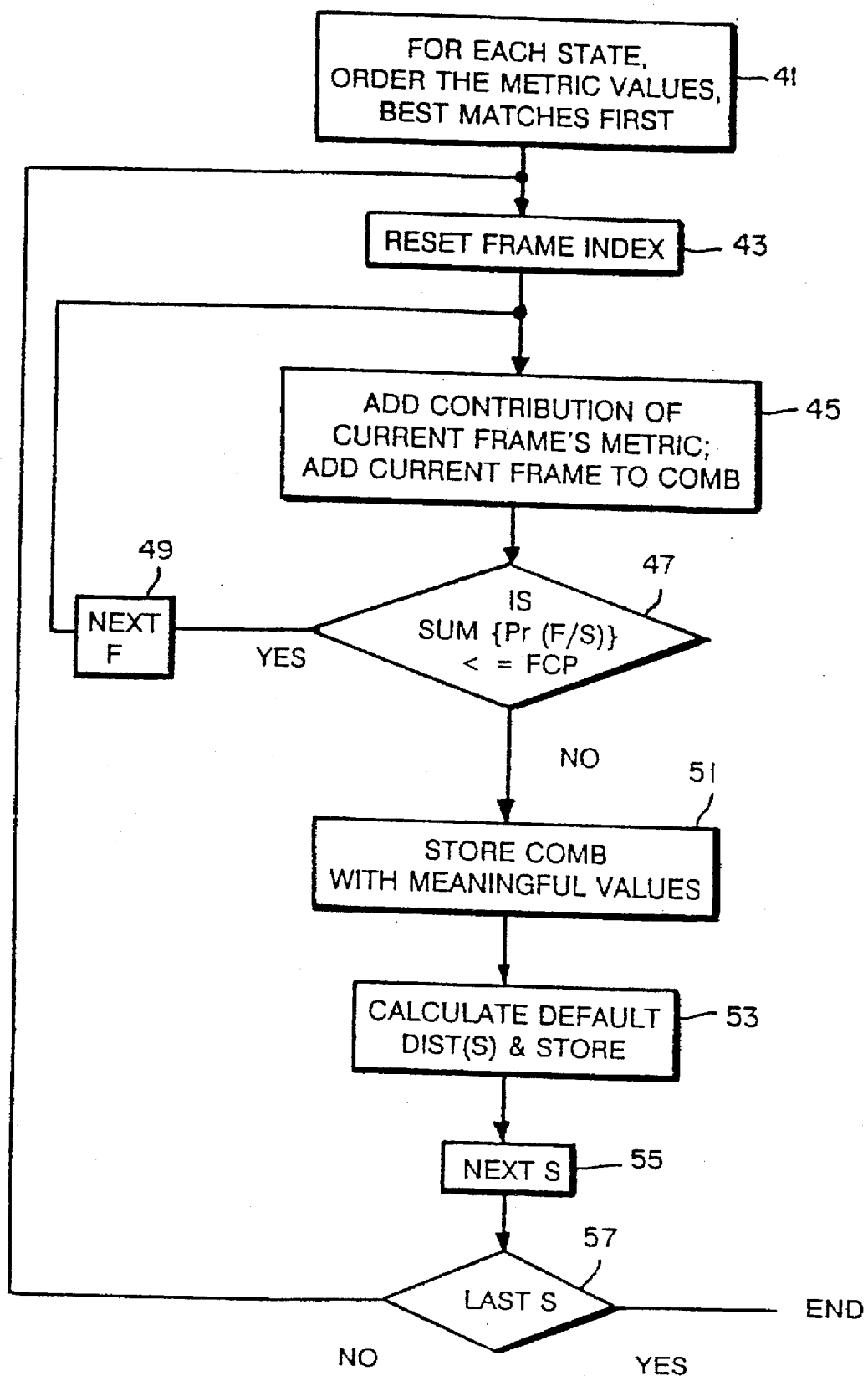
FIG. 3 is a flow chart illustrating a method of discriminating meaningful and non-meaningful metrics in a precalculated array such as that of FIG. 2.

This method of thresholding and distinguishing entries is illustrated in the flow chart of FIG. 3. As indicated at block 41, the metric values are ordered for each state, best matches first. Starting with the first frame (block 43), the current frame's metric is added as a contribution toward the cumulative probability as indicated at block 45. If the cumulation has not reached the preselected fixed cumulative probability threshold as tested at block 47, the process proceeds to the next frame as indicated at block 49.

The meaningful metrics are retained to generate a sparse or "comb" structure as described previously and this comb is stored as indicated at block 51. The default distance is then determined, as described previously, to use up the remaining probability i.e. to bring the sum of all probabilities to unity, as indicated at block 53. That default value is used for all non-meaningful metrics for that state or column. The process then proceeds to the next state as indicated at block 55 until the last state is reached as tested at block 57.

As indicated previously, the meaningful entries in the table of FIG. 2 in effect constitute a sparse matrix and the individual state columns can be likened to combs with many teeth missing. In accordance with one aspect of the invention of Ser. No. 08/250,696 now U.S. Pat. No. 5,546,499, this data structure is compressed or packed by, in effect, creating a list by overlaying one column onto another so long as no meaningful entries interfere and by introducing an offset to eliminate any interferences that do occur.

The disclosure of application Ser. No. 08/250,696 now U.S. Pat. No. 5,546,499 has been incorporated herein by reference as referenced previously. However, for the purposes of describing the present method of preselecting candidate tokens it is sufficient to note that there exists a method of rapidly determining if a designated metric is meaningful or not and, if it is, extracting the value from the compacted matrix. Values obtained from the large stored matrix are used both in the final, most precise, matching of an utterance with selected models and in the preselection of models in accordance with the present invention.

The availability of the complete precalculated matrix of distance values also allows the straightforward generation of lists, one for each frame VQ, which identify those standard prototype states for which the distance measurement is meaningful (non-default). These lists are used, as described in greater detail hereinafter, for the efficient generation of temporary comparison tables which are used by the preselection comparison procedures.

In order to reduce the number of high accuracy comparisons which must be performed, the present invention utilizes a succession of screening steps to preselect candidates. The preselection process quickly eliminates unlikely candidates but raises very little risk of incorrectly screening out a good candidate.

In the screening system implemented in the particular embodiment being described, two different high speed distance measuring functions are utilized to successively select candidate models with progressively improving accuracy of match measurement. These distance measuring functions are described in greater detail hereinafter but the following brief description serves to generally characterize the two functions so that their use in the overall system may be described. Both distance measuring functions utilize subsampling or compressing of both the unknown speech segment and the models with which the unknown segment is being compared. The second or more precise of the distance measuring functions, which is referred to hereinafter as DM2 and which utilizes a precalculated matrix designated FS_Mat, essentially performs a conventional time warping of the subsampled unknown utterance against each subsampled candidate model. The first or less precise of the distance measuring functions DM1 utilizes a precalculated matrix designated RM_Mat and performs a less constrained comparison of the reduced utterance with the subsampled model as described in detail in application Ser. No. 07/905,345 now U.S. Pat. No. 5,386,492. That application, entitled "Speech Recognition System Utilizing Vocabulary Model Preselection", was filed Jun. 29, 1992 by Wilson et al. and the disclosure of that application is also incorporated herein by reference.

As indicated previously, the present invention has particular utility in large vocabulary speech recognition systems, e.g. systems having a vocabulary of in the order of 40,000 words. In such systems, it is highly desirable that the vocabulary be partitioned and that the models within each partition be represented by a representative one of the models. A method of partitioning a vocabulary and of selecting candidates from the vocabulary is disclosed in coassigned application Ser. No. 07/424,139, now U.S. Pat. No. 5,136,654, filed by William F. Ganong, III; William F. Bauer; Daniel Sevush; and Harley M. Rosnow on Oct. 19, 1989 and entitled Speech Recognition. The disclosure of application Ser. No. 07/424,139 is incorporated herein by reference.

Figure 4:
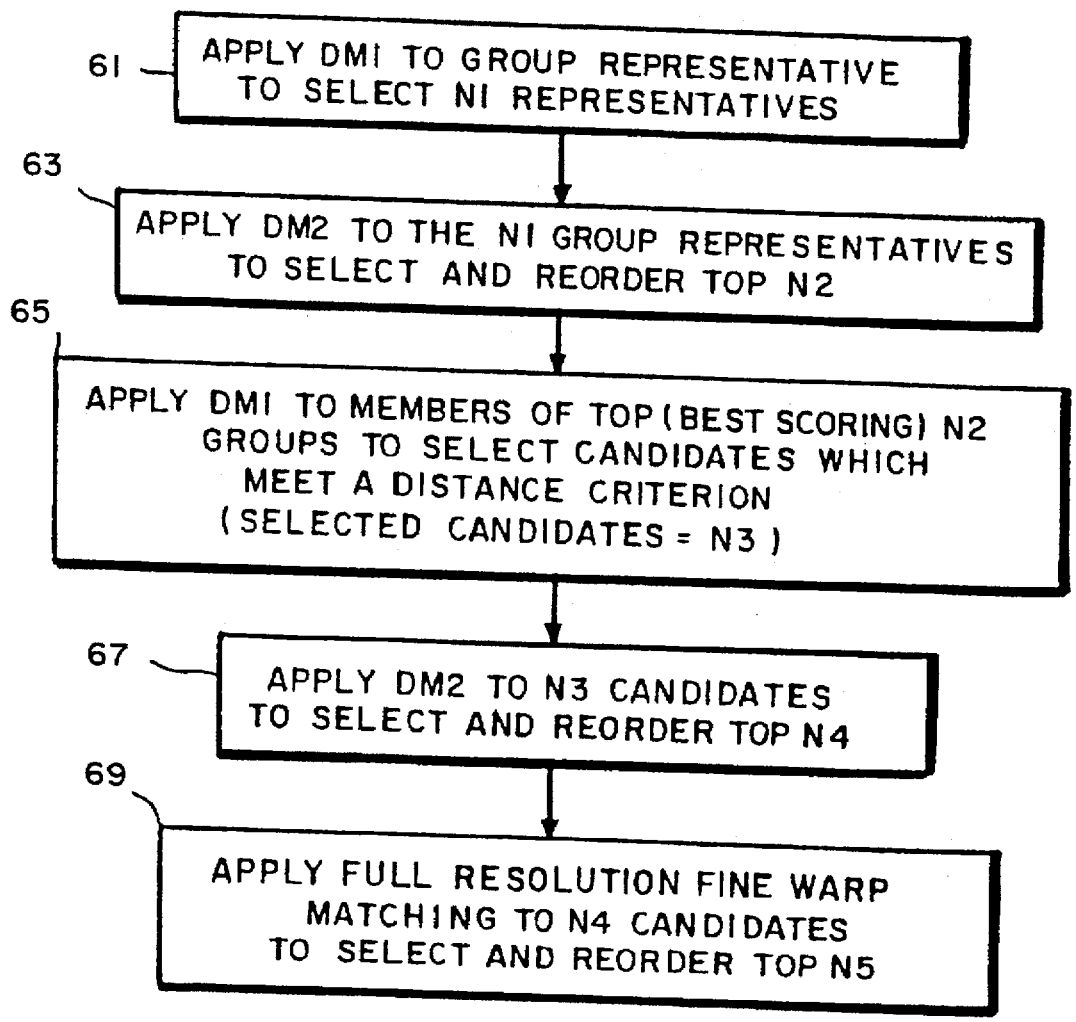
FIG. 4 is a flow chart illustrating a preferred method of employing screening or preselecting procedures in accordance with the present invention.

The overall procedure for preselecting candidate models for high accuracy comparison with the unknown speech segment is illustrated in FIG. 4 and, as may be seen, each of the distance measuring functions (DM1 and DM2) is applied to both the group or partition representatives and, thereafter, to members of the better scoring groups and/or partitions. As a first step, the fastest distance measuring function is applied to the whole collection of group representatives to select the most likely N1 of those representatives, this step being designated by reference character 61. The more precise distance measuring function DM2 is then applied to the N1 group representatives (step 63) to select and reorder the most likely ones of those, up to a second preselected number N2. After the most likely groups or partitions have been selected, the high speed distance measuring function DM1 is again utilized (step 65), this time being applied to the members of the selected partitions and is utilized to select candidates which meet a predetermined distance criterion, the number of candidates thereby selected being designated N3. The more precise distance measuring function DM2 is then applied (step 67) to the N3 candidates previously obtained thereby to select and reorder a smaller number of them, designated N 4. The full resolution fine warp, i.e. utilizing the fine sequence of frames and the fine sequence of model states, is then applied (step 69) to finally determine and order a list of words from the vocabulary which is then output to the user program.

Figure 5:
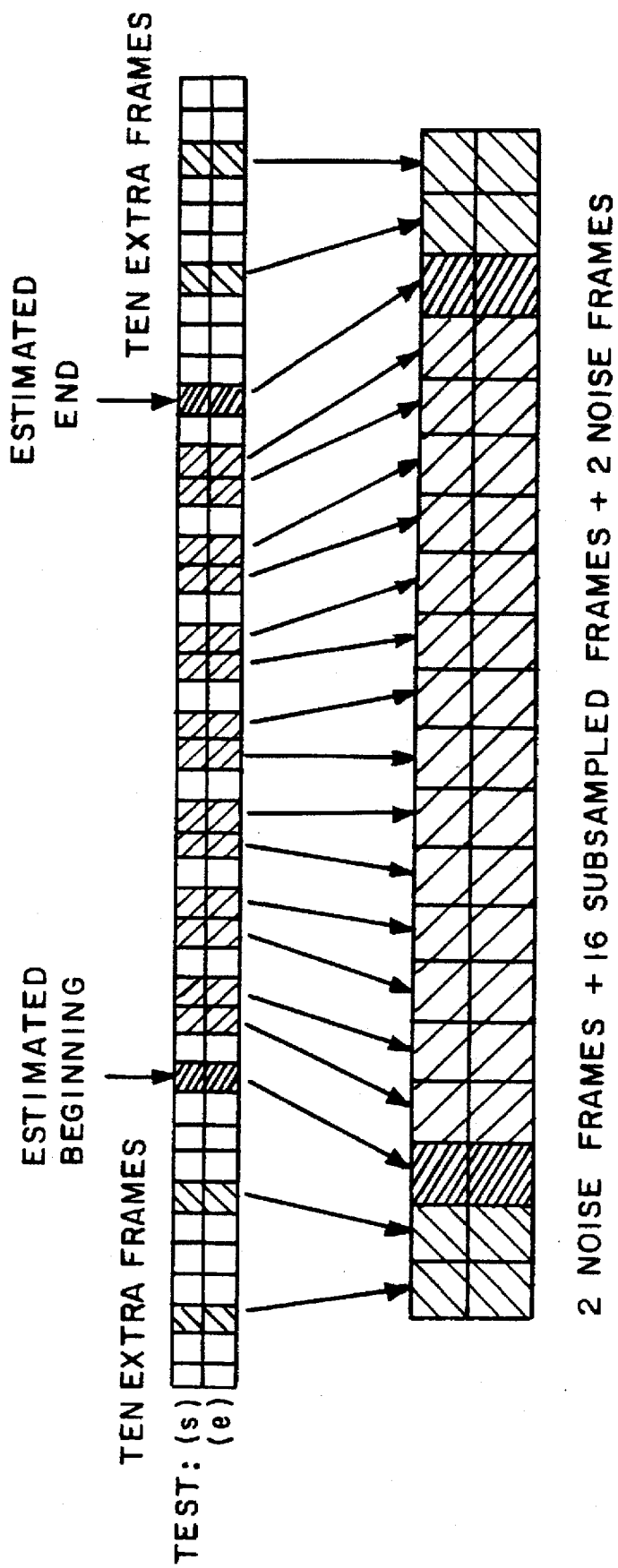
FIG. 5 is a diagram illustrating the subsampling of a sequence of prototype frames from a spoken utterance.
Figure 6:
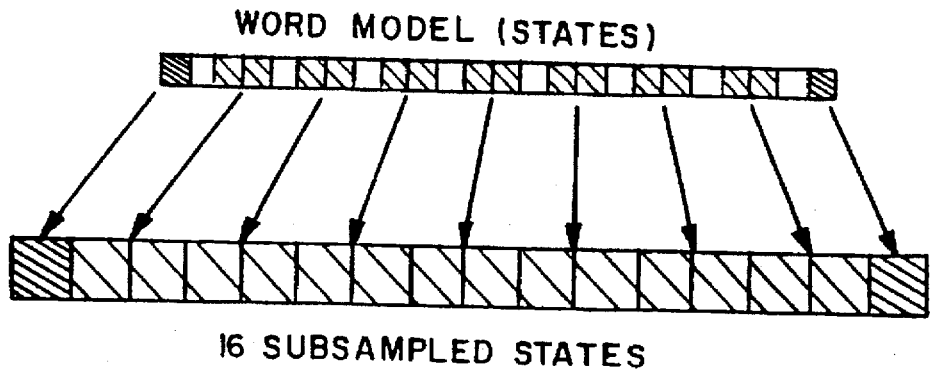
FIG. 6 is a diagram illustrating subsampling of the states of a word model.

As indicated previously, the original unknown speech input is represented by a fine sequence of frames and each vocabulary model is represented by a fine sequence of states. The frame and state sequences may not be equal in length, that is, they may comprise different numbers of elements. The number of elements in each is typically in the order of 100. To compress the input segment and models, the sequences are linearly subsampled so that the compressed version includes the first and last elements and do that the total number of elements in each sequence totals 16. This subsampling as applied to the input frames is graphically illustrated in FIG. 5. As is described in greater detail in application Ser. No. 07/905,345 now U.S. Pat. No. 5,386, 492, it may also be useful to append frames representing noise to the beginning and end of the utterance to reduce the effects of errors in endpoint determinations. FIG. 6 is a similar graphic illustration of linear sampling of a fine sequence of states representing a vocabulary model.

Figure 7:
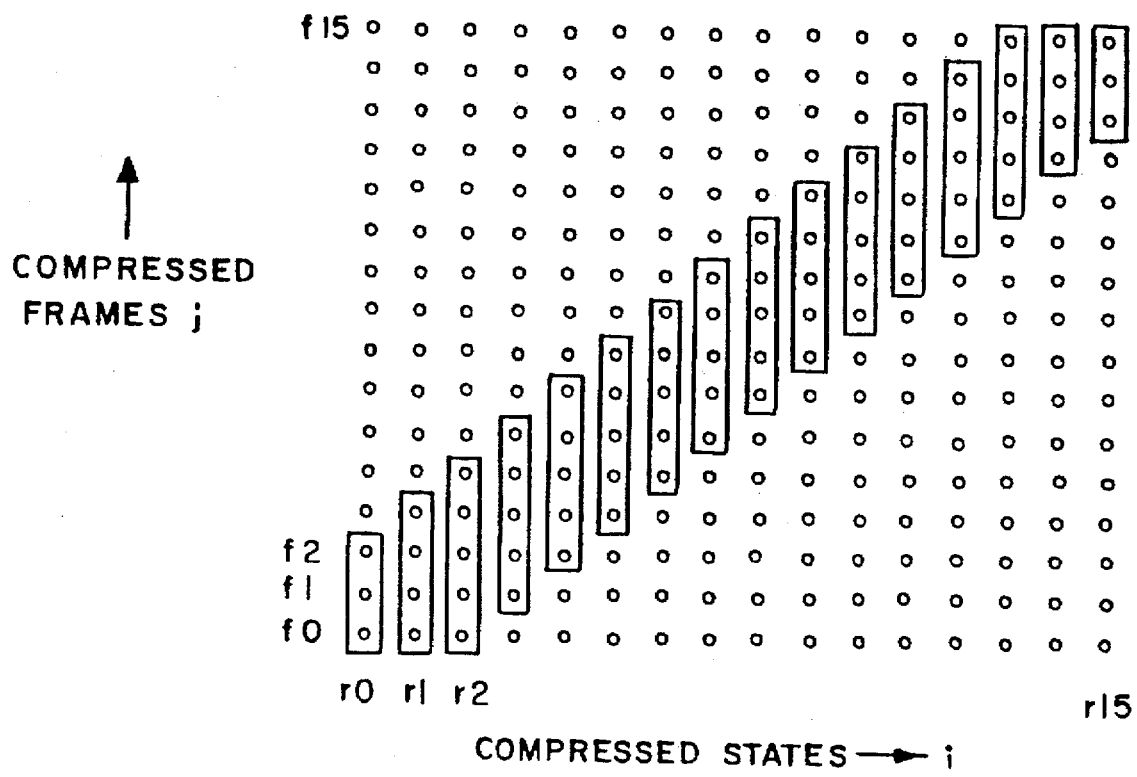
FIG. 7 is a diagram useful in explaining one of the screening procedures utilized in the method of the present invention.
Figure 8:
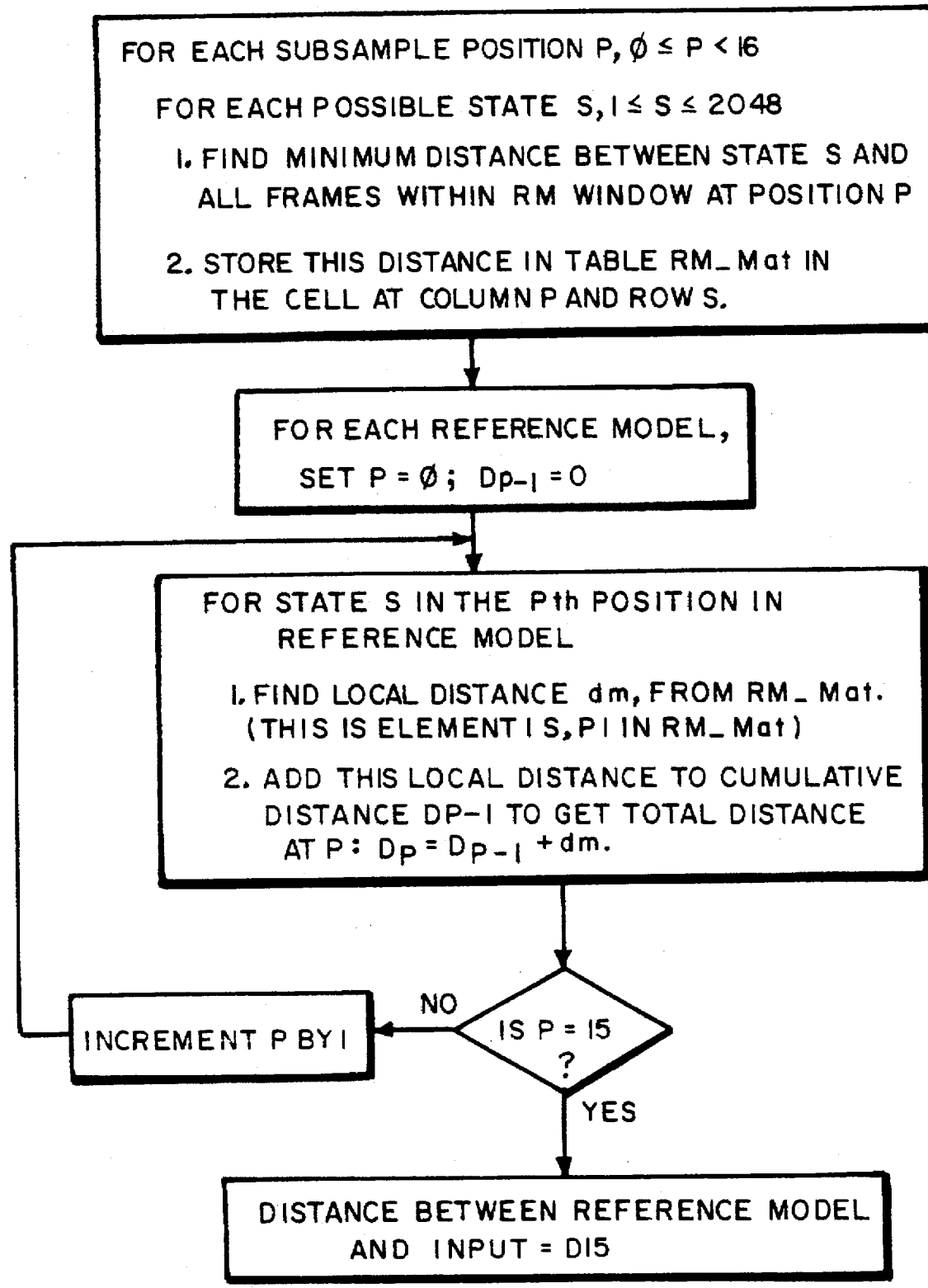
FIG. 8 is a flow chart illustrating the method of comparing subsampled input frames with subsampled model states as also illustrated in FIG. 7.

As indicated previously, the fastest of the distance measuring functions (DM1) operates without some of the constraints usually applied in time warping procedures and utilizes certain precalculated minimum distance measurements to speed the screening of a large number of candidate models. With reference to FIGS. 7 and 8, the distance measuring function DM1 compares 16 linearly subsampled frames from the unknown speech sequence with 16 linearly subsampled states from each vocabulary model which is to be considered, this comparison being represented by the matrix in FIG. 7. Not all locations within the matrix are considered but, rather, the number of frames being considered in connection with each subsample position or state column is constrained to a window of predetermined size. In FIG. 7, the windows are indicated by the enclosed block for each subsample position. In conventionally determining a time warped path through such a matrix, the path is usually subject to some local constraint, e.g. being constrained so that each location can be approached only from its left, from below, or the diagonal between those two directions. The distance function DM1, however, does not observe that constraint but, rather, in each state column, the method determines the frame which provides the best match, i.e. the lowest distance or cost, for the state which occupies that column, and considering only those frames within the preselected window or corridor for that state column but without consideration of the determinations to either side of the current state column. This is essentially a calculation involving finding the minimum among the values available in the window.

In accordance with another aspect of the invention in common with the disclosure of application Ser. No. 07/905,345 now U.S. Pat. No. 5,386,492, it is not necessary to calculate these minima for each new model which is to be considered. Rather, once the subsampled sequence of input frames is determined, the method determines, for each subsampled frame position in the input and for each of the 2048 states which could occupy that position in a model, the minimum cost or distance, i.e. the cost or distance for that one of the frames being considered which provides the best match.

The cost values are stored in a temporary comparison table or matrix which is then utilized for scoring all models against that particular utterance. For the distance function DM1, this table or matrix is designated RM_Mat. This is thus a table which comprises 16×2048 entries and which contains, at each table location, a value representing the corresponding minimum for the state index occupying the corresponding subsample position index [0–15]. Accordingly, as each new model is considered, cost values at each subsampled position can be obtained by simply indexing into the table using the position index and the index of the state which occupies that position in the model and extracting the pre-computed minimum cost value. The overall measure of match of the unknown input segment with the model is then just the sum of those cost or distance values. As will be understood by those skilled in the art, this table lookup and summing operation is a very simple operation which can be accomplished relatively quickly. Thus a large number of models can be rapidly considered. The basic procedure for generating such a table is described in application Ser. No. 07/905,345 now U.S. Pat. No. 5,386,492 and is also illustrated in the flowchart of FIG. 8. Application Ser. No. 07/905,345 now U.S. Pat. No. 5,386,492 includes a more detailed mathematical analysis of the functioning of this unconstrained comparison. A temporary comparison table, designated FS_Mat, is also precalculated for the distance function DM2 as described in greater detail hereinafter.

As indicated earlier, the second distance measuring function DM2 performs a more conventional time warp function across the matrix of subsampled sequences in that the time warp observes the usual constraints that only those paths are considered which approach a given location from the left, from below, or from the diagonal between those two directions.

The present disclosure also improves upon the basic procedure of application Ser. No. 07/905,345 now U.S. Pat. No. 5,386,492 by including an improved and faster method of building the temporary comparison tables (RM_Mat and FS_Mat) which are used in the preselection processes. This improved method utilizes default values as initial entries and then adjusts only entries which are meaningfully different from the default value as described in greater detail hereinafter.

As indicated previously, the accuracy of the cumulative match measurement obtained by these preselection distance measuring functions is not adequate for final selection. However, because the errors tend to produce candidates which score better than they should rather than lowering the score of good candidates, the method is highly effective at eliminating unlikely candidates while it produces very little risk that a good candidate will be rejected at the preselection stage.

As is understood by those skilled in the art, a system based on subsampling a fine sequence of elements is somewhat sensitive to the particular timing or phasing at which the subsamples are taken from the fine sequence, i.e., the subsampling position. Such errors can be substantially reduced by performing the distance measuring functions of the present invention not only to the subsampled sequence which is based directly on the presumed endpoint but also by applying the measuring function to subsamples which are linearly shifted from the initial sequence. While this procedure multiplies the number of calculations which must be performed by the number of shifted sequences to be tried, the distance measuring functions of the present invention are minimally demanding of computational capacity and thus the additional computational time may be relatively easily borne. This shifting technique is referred to herein as "frame stuffing" and can be described in mathematical terms as follows together with its application to the generation of the precalculated matrices.

Assume we have an input utterance which we subsample, and call the resulting sampling positions P. The index of the original, non-subsampled frame corresponding to each position is F, given by $F=Fr(P)$. Each frame F contains a particular prototype or VQ index $VQ(F)$. There are 1024 VQs in the particular embodiment being described.

For the first computation, we have the following. For each reference state S, and for a selected input position P corresponding to input frame index $F=Fr(P)$, we look at a window of non-subsampled input frames surrounding F, $Window(F) = \{F-n, F-n+1, \ldots, F-1, F, F+1, \ldots, F+n-1, F+n\}$, and compute the summed distance:

$$FS\_Mat(S,P) = SUM \{Dist(S, VQ(F'))\} \ F' \text{ is in Window } (F=Fr(P))\}.$$

The second computation looks over a small range of the above quantities and chooses the minimum:

$$RM\_Mat(S,P) = MIN \{FS\_Mat(S,P')\} \ P' \text{ is in the range under consideration}\}.$$

These are essentially the same computations disclosed in Ser. No. 07/905,345 now U.S. Pat. No. 5,386,492. However, in accordance with another aspect of the present invention, the temporary comparison tables utilized in these computations are more quickly generated for each new utterance because of the use of a thresholding methodology which requires computation of only meaningful values in the tables, the other entries in the tables being filled with default values.

As indicated previously and as described also in application Ser. No. 07/905,345 now U.S. Pat. No. 5,386,492, both of the screening distance measuring functions DM1 and DM2 benefit from utilizing, for each new utterance, a precalculated temporary table of distance values which relate each of the 16 representatives to all of the possible prototype states. In accordance with the present invention, the generation of such temporary tables is simplified and sped up and is accomplished substantially more quickly by substituting non-meaningful values with a default value using thresholding techniques essentially the same as those disclosed in application Ser. No. 08/250,696 now U.S. Pat. No. 5,546,499. This approach uses distance values obtained from the large compacted matrix described previously and the lists derived from that matrix as described hereinbefore. In the following description, the temporary comparison table or matrix for the first distance measuring function DM1 is referred to as RM_Mat and the temporary comparison table or matrix for the second distance measuring function DM2 is referred to as FS_Mat.

While the coarser distance measuring function DM1 is utilized first in evaluating a collection of models, the temporary comparison table utilized in the second distance measuring function DM2 is preferably calculated first since certain values can be obtained which are then useful in efficiently calculating the temporary matrix RM_Mat used in the first distance measuring function DM1.

As indicated previously, the existence of the large or complete distance matrix which is stored in compacted form enables the creation of lists, identifying for each input frame prototype (VQ), the set of states S for which the distance metric, designated Dist(S,VQ), is meaningful or non-default. The necessary information can be created and stored in the following manner:

for each input frame prototype, VQ
    NumNDStates (VQ)=number of states for which distance isn't default
    State(VQ,i)=ith nondefault state (0<i<=NumNDStates (VQ))
    StateDist(VQ,i)=the corresponding score.

This computation is done once at startup and presents no incremental load with use. The availability of these lists avoids a large number of accesses to the large compacted distance matrix.

As indicated previously, the matrix FS_Mat comprises 16×2048 locations. Initially, this array is filled with the values which would be obtained if all scores were default. This is clearly an incorrect assumption but correcting the values in locations where they are wrong is more efficient than if all the values were computed starting out since, like the large compacted matrix, the matrix FS_Mat is relatively sparse when only non-default values are considered. The initial filling can be described as follows:

FS_Mat(S,P)=(#frames in FS window)*DefaultDist(S).

Next, as indicated previously, using the match score between the subsampled input utterance (of length 16) and the subsampled vocabulary model, a series of minimizations are performed. For each state in the model, a window is formed spanning several input positions and the minimum distance found within the window is selected. This operation is repeated for each of the states in the subsampled model and the minimum distances are summed. An additional feature of this stage, as described previously, is the nature of the distances involved in the minimization. That is, they are actually composite distances, a sum of the States/VQ distances for a small block of VQ indices from the non-subsampled input utterance, in accordance with the so-called frame stuffing procedure described previously. The subsampled or representative input positions are designated as P even though a window of frame positions may be involved in accordance with the frame stuffing procedure.

The procedure for correcting non-default values in the initialized matrix FS_Mat is as follows.

First, we loop through the subsampled input token positions P for which FS_Mat is to be computed. Then, for each position P we loop through the input frames F in the window at position P. For each of these frames F, we scan the list structure identifying the non-default states for the vq index VQ which corresponds to frame F.

Using the list of non-default states S, we update FS_Mat (S,P):

```
for each input position P
    for each frame in the window at P, F={F-n,...,F+n},
                                    where F = Fr(P)
        for each active state for VQ = VQ(F), S = State
(i),
                        i = 1,...,NumNDStates(VQ)
            FS_Mat(S,P) += StateDist(VQ,i) - DefaltDist
(S).
```

That is, we are undoing the assumption that a given value is default or not meaningful. Note that FS_Mat(S,P) contains the desired values and that a non-exhaustive computation was performed.

In addition, while we're doing the above computation, we build an additional structure which lists all the states S at each input position P whose FS distance contains at least one non-default value. That is, we want a list of all the items in the FS matrix which cannot be created using default values only. It is important to note that this information is not readily obtainable from the "non-default-states" structures or lists defined earlier, because multiple input frames contribute to each FS value in accordance with the "frame stuffing" procedure, and any combination of these frames/ states could have default or non-default values.

Thus, for each input position P, we maintain a list of the states indices S, indicating locations in the FS_Matrix which contain non-default values. This procedure can be described as follows:

```
for each input position P
    count NumActiveStates(P)
    for each nondefault state, i store
        ActiveStateList(P,i).
```

This data structure "ActiveStateList" is used in constructing the temporary comparison table RM_Mat used in the preselection procedure DM1 as follows. RM_Matrix values are computed for 16 positions P. Again, the matrix is initialized by being set to all default values in the following manner.

For each state S, and input position P, we set RM_Mat to the default value:

RM_Mat(S,P)=(#frames in FS window), DefaultDist(S).

We then loop over input positions P and at each such position we scan the nearby positions P' defined by the window centered at P, i.e. the enclosed regions illustrated in FIG. 7. For each P' we loop through the ActiveStateList(P',i) and update RM_Mat in the following manner.

```
for each input position P
    for each nearby position P' = {P-n,..P,.P+n}
        for each nondefault state for P'
        on ActiveStateList(P',i)
        (0 < i < NumActiveStates(P'))
            if (RM_Mat(S,P) < FS_Mat(S,P'+2))
                RM_Mat(S,P) = FS_Mat(S,P'+2).
```

Again, we obtain savings by only computing the nondefault scores. The calculations performed during the actual application of the distance measuring functions were described previously.

As indicated earlier, the second distance measuring function DM2 is utilized twice in the overall system to improve initial screenings by the faster distance measuring function DM1, each of the distance measuring functions being applied initially to the collection of models which represent partitions and then to members of the better scoring partitions. Though the selection process thus involves multiple stages, the stages are gradiated in accuracy with the earliest screenings being performed by the fastest functions. Further, to the extent that the screening functions do not produce accurate results, it is the direction of allowing less likely candidates to exhibit better scores rather than worsening the scores of likely candidates and thus overall speed of selection is markedly improved while incurring minimal risk that the best or any good candidate will be eliminated inappropriately.

Figure 9:
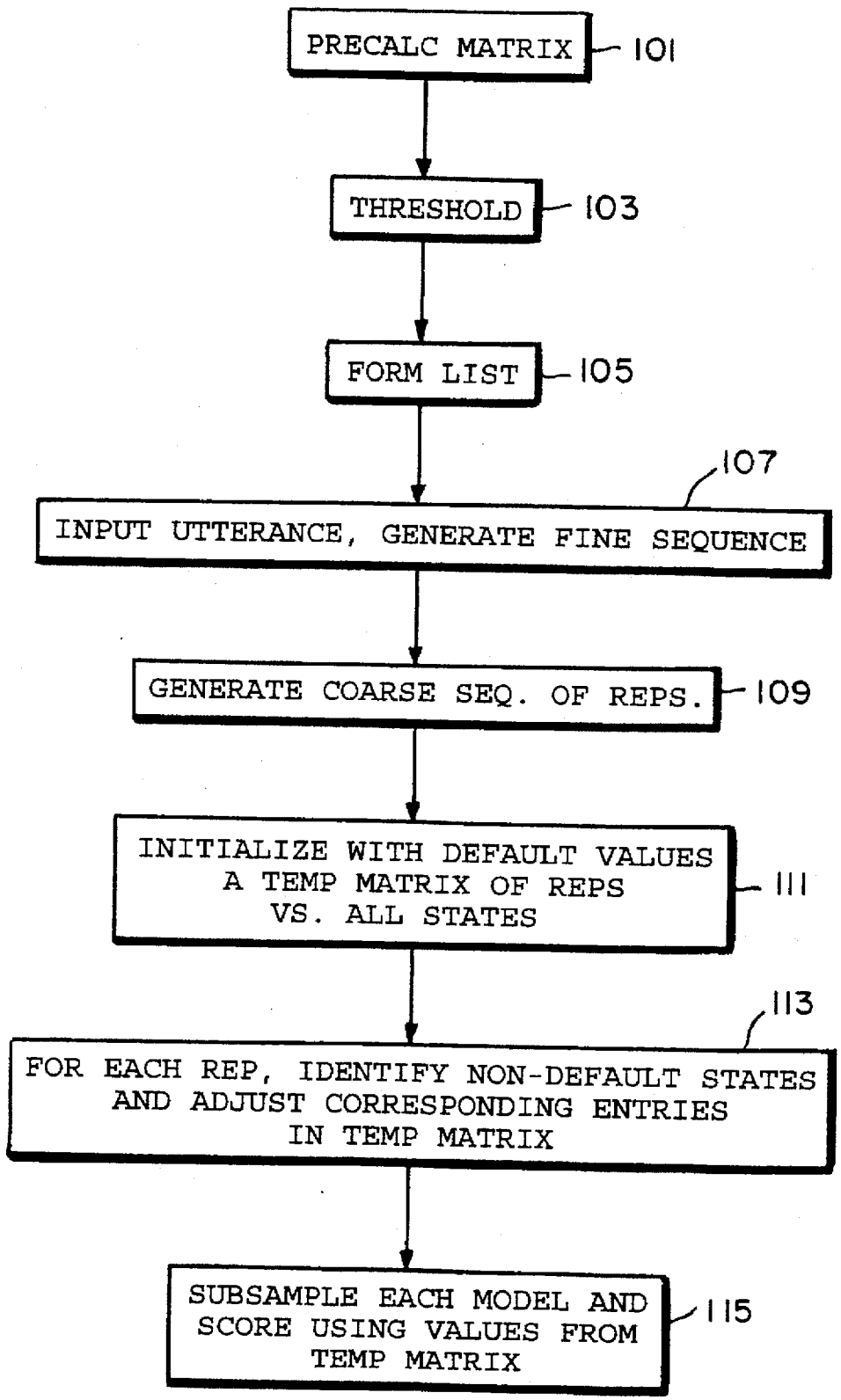
FIG. 9 is a flow chart illustrating a generic procedure which is utilized in both of the preselection procedures employed in the practice of the preferred embodiment of the present invention.

While the preferred embodiment described herein employs two preselection procedures, it should be understood that either one might be utilized without the other and further, that there exists a generic procedure which is common to both of the preselection processes in the creation of temporary comparison tables using precalculated and thresholded distance values. FIG. 9 is a flow chart which illustrates the generic methodology. As described, the method utilizes a matrix which is precalculated, as indicated at block 101, to relate, by a suitable distance metric, all prototype states with all prototype model states. The matrix is then thresholded, as indicated at block 103, so that all entries, which do not meet a preselected criterion for being meaningful, are replaced by a default value.

As indicated at block 105, lists are generated which identify, for each prototype frame, those prototype states which reflect a non-default or meaningful distance value. When an unknown utterance is input, as indicated at 107, a corresponding fine sequence of prototype frames is generated. From this fine sequence of prototype frames, a sequence of representatives is then generated, as indicated at block 109. As disclosed, this coarse sequence may be generated by subsampling preferably with frame stuffing or averaging as described. The temporary matrix relating to representatives with all possible prototype states is initiated with default values as indicated at block 111. Using the list generated at step 105, the non-default states for each involved representative are identified and adjustments are made in the corresponding entries in the temporary matrix. Each vocabulary word model which is to be considered is then subsampled as indicated at block 115 and scored against the utterance using values quickly and easily obtained from the temporary matrix.

Figure 10:
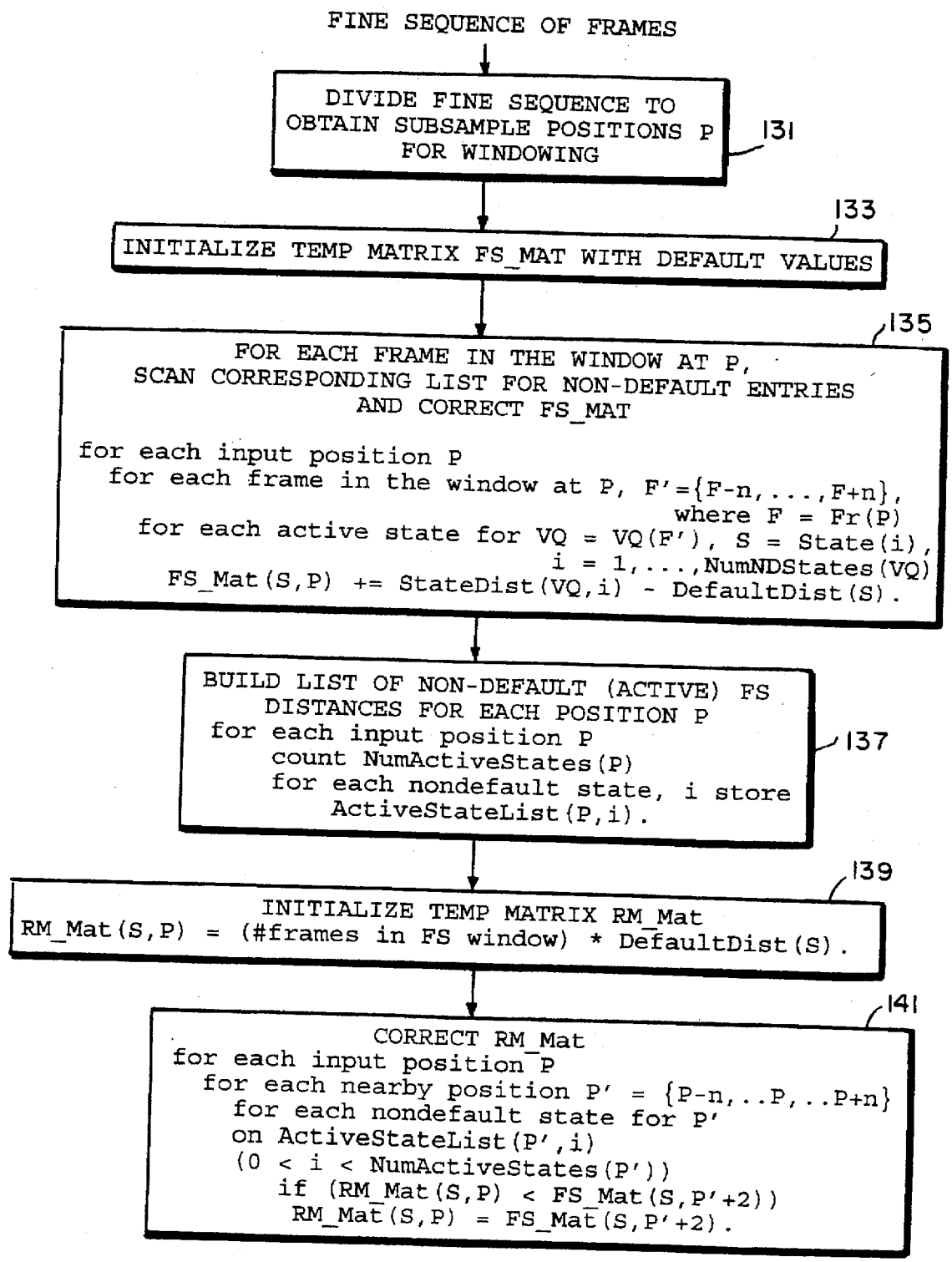
FIG. 10 is a flow chart illustrating in greater detail the two preselection procedures employed in the practice of the present invention.

The more detailed screening procedures performed in the preferred embodiment are illustrated in greater detail in FIG. 10. As indicated at block 131, the fine sequence of frames is divided to obtain a series of subsample positions for windowing.

As indicated at block 133, a first temporary matrix FS_Mat, is initialized with default values. Then, for each frame in the defined window at each location P, the corresponding lists are scanned for non-default entries and the identified entries are corrected in accordance with the pseudo code given.

From the same information which is available in the temporary table FS_Mat, a list is created, as indicated at block 137, for each position P of the non-default distances in the FS_Mat table. As indicated at block 139, a second temporary matrix RM_Mat is initialized with default distances. Then, using the lists generated at block 137, the second matrix is updated or corrected by scanning the lists in accordance with the pseudo code given. Once both temporary comparison tables or matrices are corrected from their initialized default situation, the distance measuring functions DM1 and DM2 can be utilized in the screening over preselection steps, preferably repeatedly in the manner illustrated in FIG. 4.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a computer implemented system for recognizing spoken utterances which compares an unknown speech segment represented by a fine sequence of frames selected from a preselected set of prototype data frames with at least some of a vocabulary of word models each of which is represented by a fine sequence of prototype states selected from a preselected set of prototype states, a method of preselecting candidate models comprising:

providing a precalculated matrix of distance metrics relating said prototype frames with said prototype states;

thresholding said matrix by assigning a default value to metrics which do not meet a preselected criterion for being meaningful;

for each prototype frame, forming a list of prototype states for which the distance metric is meaningful;

for each input utterance, generating a fine sequence of prototype frames and a coarse set of input representative frames selected from said fine sequence, the number of representatives being a minor fraction of the number of frames in the corresponding fine sequence of frames and being distributed in position along said fine sequence;

for each input utterance, generating a temporary matrix of distance metrics relating each of said sequence of input representatives to said states by performing the following steps:

(a) setting all entries in said temporary matrix to the default value;

(b) sequentially scanning said input representatives to locate the corresponding lists for included prototype states;

(c) adjusting those entries in said temporary matrix which are included in said corresponding lists; and subsampling at least a selected portion of said vocabulary models and scoring the subsampled prototype states from said selected models using distance metrics obtained from said temporary matrix, the scoring providing a basis for preselection of candidate models for further processing.

2. A method as set forth in claim 1 wherein the generation of said coarse set includes subsampling of the fine sequence at a number of spaced positions along said fine sequence.

3. A method as set forth in claim 2 wherein the generation of said coarse set further includes the combining of distances obtained at said subsampled positions with distances obtained at positions adjacent to said subsampled positions thereby to effect a time averaging.

4. A method as set forth in claim 1 wherein the scoring performs a time warping of the coarse set of representatives with the subsampled states.

5. A method as set forth in claim 1 wherein said scoring includes determining, for each subsampled state, the input representative within a predetermined range of representatives which provides the best match.

6. In a computer implemented system for recognizing spoken utterances which compares an unknown speech segment represented by a fine sequence of frames selected from a preselected set of prototype data frames with at least some of a vocabulary of word models each of which is represented by a fine sequence of prototype states selected from a preselected set of prototype states, a method of preselecting candidate models comprising:

provided a precalculated matrix of distance metrics relating said prototype frames with said prototype states;

thresholding said matrix by assigning a default value to metrics which do not meet a preselected criteria for being meaningful;

for each prototype frame, forming a list of prototype states for which the distance metric is meaningful;

for each input utterance, generating a fine sequence of prototype frames;

dividing said fine sequence into a series of equal segments thereby to obtain a coarse set of input sample positions along said fine sequence, the number of sample positions being a minor fraction of the number of frames in the corresponding fine sequence of frames;

for each input utterance, generating a temporary matrix of distance metrics relating each of said sequence of input sample positions to said states by performing the following steps:
(a) setting all entries in said temporary matrix to the default value;
(b) sequentially scanning a predetermined number of input frames adjacent to and including each input sample position to locate the corresponding lists for included prototype states;
(c) determining the one of said predetermined number of frames which best matches each included prototype state; and
(d) adjusting those entries in said temporary matrix which correspond to said best matches; and subsampling at least a selected portion of said vocabulary models and scoring the subsampled prototype states from said selected models using distance metrics obtained from said temporary matrix, the scoring providing a basis for preselection of candidate models for further processing.

7. In a computer implemented system for recognizing spoken utterances which compares an unknown speech segment represented by a fine sequence of frames selected from a preselected set of prototype data frames with at least some of a vocabulary of word models each of which is represented by a fine sequence of prototype states selected from a preselected set of prototype states, a method of preselecting candidate models comprising:

precalculating a matrix of distance metrics relating said prototype frames with said prototype states;

thresholding said matrix by assigning a default value to metrics which do not meet a preselected criterion for being meaningful;

for each prototype frame, forming a list of prototype states for which the distance metric is meaningful;

for each input utterance, generating a fine sequence of prototype frames and a coarse set of a predetermined number of input representative frames selected from said fine sequence, the predetermined number of representatives being a minor fraction of the number of frames in the corresponding fine sequence of frames;

for each input utterance, generating a temporary matrix of distance metrics relating each of said sequence of input representatives to said states by performing the following steps:
(a) setting all entries in said temporary matrix to the default value;
(b) sequentially scanning said input representatives to locate the corresponding lists for included prototype states;
(c) adjusting those entries in said temporary matrix which are included in said corresponding lists; and for each model to be considered, subsampling the corresponding fine sequence of states to obtain a respective coarse sequence comprising a predetermined number of states;

said predetermined numbers together defining a comparison matrix, there being a preselected region within said matrix which is examined by said method;

for each state in said limited collection, determining for each state position in said comparison matrix the input representative which provides the best match with that state, considering and examining only frames which lie within said preselected region, a measure of the match being stored in a table;

calculating, using said table, for each model to be considered a value representing the overall match of said coarse sequence of frames with the respective coarse sequence of states;

preselecting for accurate comparison those models with the better overall match values as so calculated.

8. The method as set forth in claim 7 wherein, in determining the input frame which provides the best match for each possible state in each possible matrix position, the method examines not only the respective subsampled frame but also a preselected number of frames which precede and follow the respective subsampled frame in said fine sequence of frames.

9. In a computer implemented system for recognizing spoken utterances which compares an unknown speech segment represented by a fine sequence of frames selected from a preselected set of prototype data frames with at least some of a vocabulary of word models each of which is represented by a fine sequence of prototype states selected from a preselected set of prototype states, a method of preselecting candidate models comprising:

providing a precalculated matrix of distance metrics relating said prototype frames with said prototype states;

thresholding said matrix by assigning a default value to metrics which do not meet a preselected criteria for being meaningful;

for each prototype frame, forming a list of prototype states for which the distance metric is meaningful;

for each input utterance, generating a fine sequence of prototype frames;

dividing said fine sequence into a series of equal segments thereby to obtain a coarse set of input sample positions along said fine sequence, the number of sample positions being a minor fraction of the number of frames in the corresponding fine sequence of frames;

for each input utterance, generating a first temporary matrix of distance metrics relating each of said sequence of input sample positions to said states by performing the following steps:
(a) setting all entries in said first temporary matrix to a default value;
(b) sequentially scanning said input representatives to locate the corresponding lists for included prototype states;
(c) adjusting those entries in said temporary matrix which are included in said corresponding lists;

for each input utterance, also generating a second temporary matrix of distance metrics relating each of said sequence of input sample positions to said states by performing the following steps:

- (d) setting all entries in said second temporary matrix to a default value;
- (e) sequentially scanning a predetermined number of input frames adjacent to and including each input sample position to locate the corresponding lists for included prototype states;
- (f) determining the one of said predetermined number of frames which best matches each included prototype state; and
- (g) adjusting those entries in said temporary matrix which correspond to said best matches; and subsampling at least a selected portion of said vocabulary models;

scoring the subsampled prototype states from said selected models first using distance metrics obtained from said second temporary matrix; and selecting a group of the models scoring higher using said second matrix for scoring using distance metrics obtained from said first matrix.

10. A method as set forth in claim 9 wherein the scoring using distance metrics obtained from said first matrix follows a time warping of said sample positions against said subsampled prototyped states.

* * * * *